United States Patent
Georgin et al.

(10) Patent No.: US 9,975,628 B2
(45) Date of Patent: May 22, 2018

(54) ANTI-SKID PROTECTION WITH UNDETECTED PRESSURE SENSOR FAILURE

(71) Applicant: GOODRICH CORPORATION, Charlotte, NC (US)

(72) Inventors: Marc Georgin, Dayton, OH (US); Richard Paul Metzger, Jr., Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 302 days.

(21) Appl. No.: 14/981,235

(22) Filed: Dec. 28, 2015

(65) Prior Publication Data

US 2017/0183087 A1    Jun. 29, 2017

(51) Int. Cl.
 *B64C 25/46* (2006.01)
 *B60T 8/86* (2006.01)
 *B60T 17/18* (2006.01)
 *B60T 8/17* (2006.01)

(52) U.S. Cl.
 CPC ............ *B64C 25/46* (2013.01); *B60T 8/1703* (2013.01); *B60T 8/86* (2013.01); *B60T 17/18* (2013.01)

(58) Field of Classification Search
 CPC combination set(s) only.
 See application file for complete search history.

(56) References Cited

U.S. PATENT DOCUMENTS

| | | | |
|---|---|---|---|
| 4,078,845 A * | 3/1978 | Amberg | B60T 8/1703 244/111 |
| 6,079,799 A | 6/2000 | Sawada et al. | |
| 6,161,904 A | 12/2000 | Schmidt et al. | |
| 6,820,946 B2 | 11/2004 | Salamat et al. | |
| 9,771,057 B2 * | 9/2017 | Georgin | B60T 17/221 |
| 2004/0001118 A1 * | 1/2004 | Davis | B41J 2/16547 347/32 |

(Continued)

FOREIGN PATENT DOCUMENTS

| | | |
|---|---|---|
| DE | 102015108981 | 12/2015 |
| WO | 9850262 | 11/1998 |

OTHER PUBLICATIONS

Extended European Search Report dated May 19, 2017 in European Application No. 16205723.6.

*Primary Examiner* — Thomas G Black
*Assistant Examiner* — Ana D Thomas
(74) *Attorney, Agent, or Firm* — Snell & Wilmer L.L.P.

(57) ABSTRACT

A method for controlling brakes is provided. The method comprises detecting an imminent skid by an anti-skid controller/deceleration controller (ASK/DK). The ASK/DK outputs at least one of a negative desired pressure command to a pressure control unit (PK) in response to detecting the imminent skid and causes a current command output from the PK to be reduced to release braking pressure if the negative desired pressure command minus a measured feedback pressure is greater than a deadband of the PK or outputs a negative desired force command to a force control unit (ForK) in response to detecting the imminent skid and causing a current command output from the ForK to be reduced to release braking force if the negative desired force command minus a measured feedback force is greater than a deadband of the Fork. A brake control system is also provided.

20 Claims, 4 Drawing Sheets

(56) References Cited

U.S. PATENT DOCUMENTS

| | | | | |
|---|---|---|---|---|
| 2005/0269872 A1* | 12/2005 | Ralea | ........................ | B60T 8/00 |
| | | | | 303/20 |
| 2007/0132311 A1* | 6/2007 | Giazotto | ............... | B60T 8/1703 |
| | | | | 303/126 |
| 2010/0117447 A1* | 5/2010 | Cahill | ................... | B60T 8/1703 |
| | | | | 303/126 |
| 2017/0267337 A1* | 9/2017 | Georgin | .................. | B64C 25/46 |

* cited by examiner

ANTI-SKID PROTECTION WITH UNDETECTED PRESSURE SENSOR FAILURE

FIELD

The present disclosure relates to aircraft braking systems. In particular, the disclosure relates to systems and methods for providing antiskid protection with an undetected pressure sensor failure.

BACKGROUND

Aircraft brake systems typically employ a series of friction disks compressed together to stop the aircraft. The braking systems may limit skid conditions using locked wheel functionality and antiskid algorithms. The antiskid algorithm may rely in part on pressure sensors to apply a braking pressure at the wheels. However, the pressure sensor may fail with a reading in a normal operating range and thus go undetected. At the boundary condition, where the pressure sensor fails to an undetected and constant value less than a pressure controller deadband, the conventional antiskid function may not be able to release the braking pressure to zero using the pressure controller.

SUMMARY

A method for controlling brakes is provided, according to various embodiments. The method comprises detecting an imminent skid by an anti-skid controller/deceleration controller (ASK/DK). The ASK/DK at least one of outputs a negative desired pressure command to a pressure control unit (PK) in response to detecting the imminent skid and causes a current command output from the PK to be reduced to release braking pressure if the negative desired pressure command minus a measured feedback pressure is greater than a deadband of the PK or outputs a negative desired force command to a force control unit (ForK) in response to detecting the imminent skid and causing a current command output from the ForK to be reduce to release braking force if the negative desired force command minus a measured feedback force is greater than a deadband of the ForK. A brake control system is also provided.

A brake control system is provided, in accordance with various embodiments. An anti-skid/deceleration control unit (ASK/DK) is configured to detect an imminent skid and to output a negative desired pressure command in response to detecting the imminent skid. A pressure control unit (PK) is configured to output a reduced current command to release the braking pressure if the negative desired pressure command minus a measured feedback pressure is greater than a deadband of the PK.

A brake control system is provided, in accordance with various embodiments. The brake control system comprises a processor and a tangible, non-transitory memory configured to communicate with the processor. The tangible, non-transitory memory has instructions stored thereon that, in response to execution by the processor, cause an anti-skid/deceleration (ASK/DK) control unit to perform operations comprising detecting an imminent skid and outputting at least one of a negative desired pressure command to a pressure control unit (PK) in response to detecting the imminent skid and causing a current command output from the PK to be reduced to release braking pressure if the negative desired pressure command minus a measured feedback pressure is greater than a deadband of the PK or a negative desired force command to a force control unit (ForK) in response to detecting the imminent skid and causing a current command output from the ForK to be reduced to release braking pressure if the negative desired force command minus a measured feedback force is greater than a deadband of the Fork.

In any of the foregoing embodiments, a maximum negative value of the negative desired pressure command value, the deadband of the PK, and deadband of the ForK are pre-set. Detecting an imminent skid is based on at least one of a fixed deceleration command value, a filtered wheel speed value, and a filtered wheel acceleration value. Causing the current command output from the PK to release braking pressure occurs with an undetected pressure sensor failure at a constant pressure value that is at least one of at or below the deadband of the PK and causing the current command output from the ForK to be reduced to release braking force occurs with an undetected force sensor failure at a constant force value that is at least one of at or below the deadband of the ForK. Causing the current command output from the PK to be reduced occurs because the PK adjusts the current command in an attempt to equalize the measured feedback pressure with the negative desired pressure command. command and causing the current command output from the ForK to be reduced occurs because the ForK adjusts the current command in an attempt to equalize the measured feedback force with the negative desired force command. The negative desired pressure command minus the measured feedback pressure comprises a pressure error input, and causing the current command output from the PK to be reduced occurs because the PK adjusts the current command in an attempt to achieve a zero pressure error input and wherein the negative desired force command minus the measured feedback force comprises a force error input, and causing the current command output from the ForK to be reduced occurs because the ForK adjusts the current command in an attempt to achieve a zero force error input.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
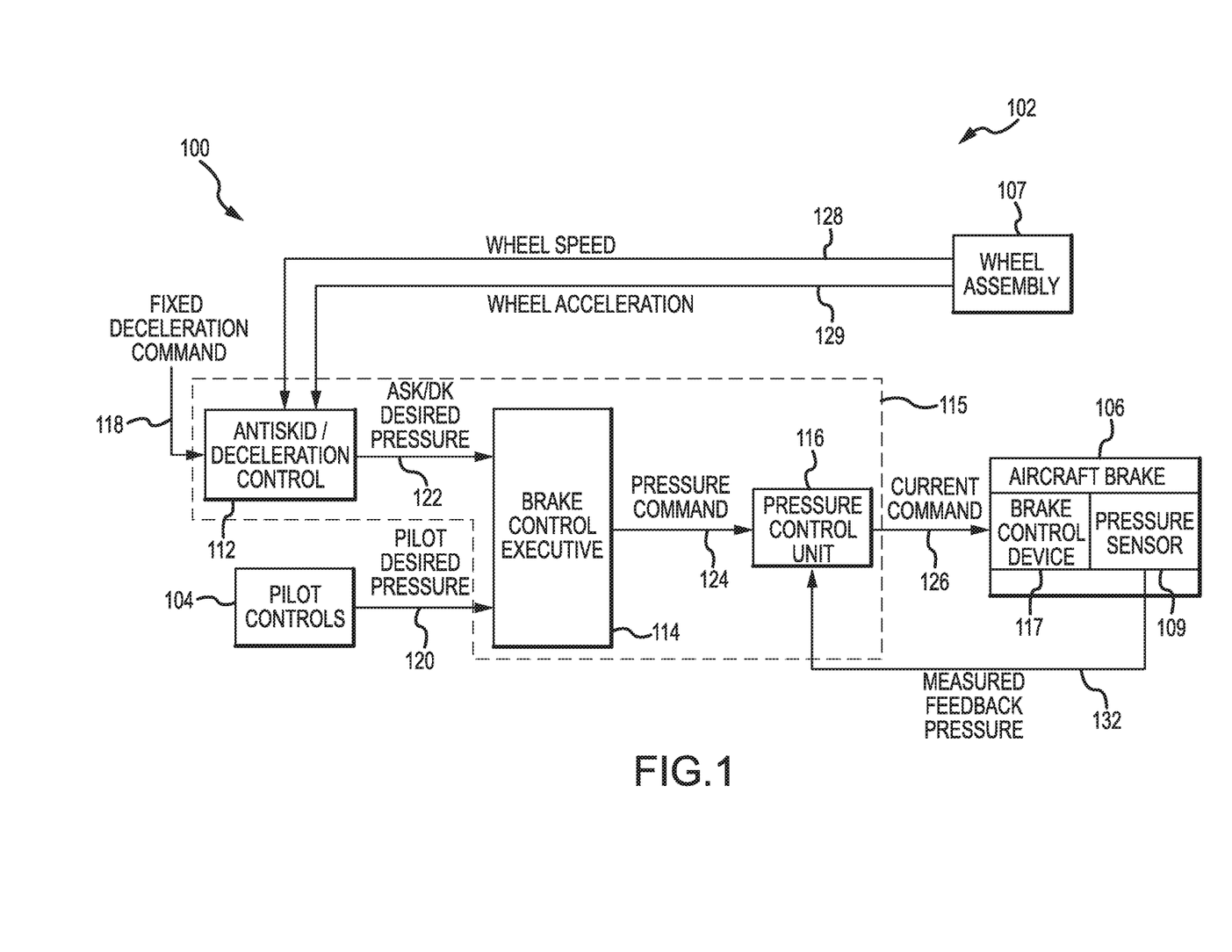
FIG. 1 illustrates a hydraulic brake system on an aircraft for providing antiskid protection with an undetected pressure sensor failure, in accordance with various embodiments.

Referring to FIG. 1, system 100 for aircraft braking may provide antiskid protection by controlling a brake 106. The system 100 includes a brake control unit (BCU) 102, a set of pilot controls 104, the brake 106, and a wheel assembly 107. In various embodiments, the brake 106 may apply stopping force in response to pressure applied by a brake control device 117. The brake control device 117 may be an electronically controlled servo configured to actuate a hydraulic valve and thereby control the stopping force generated by the brake 106. The brake control device 117 may receive an instruction to apply pressure to one or more friction disks of the brake 106. In response, the brake control device 117 may open and/or close a valve to varying degrees to adjust the pressure applied by the brake 106, thus decelerating the wheel assembly 107 in a controlled manner. This pressure may be referred to as a braking pressure. In various embodiments, the brake control device 117 may also be an electromechanical brake actuator configured to actuate a ram against the brake stack in response to a current and/or voltage applied to the actuator. The force of the ram compressing the brake stack provides braking pressure to stop the wheel assembly 107.

In various embodiments, the BCU 102 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination of processing logic.

In various embodiments, a pilot may control the brake 106 using the pilot controls 104. For example, the BCU 102 may receive a pilot desired pressure value 120 that corresponds to a desired amount of braking. The pilot desired pressure value 120 may be generated or altered in response to a depression of a brake pedal within a cockpit of the aircraft. The pilot desired pressure value 120 may also be generated or altered in response to an instruction to retract landing gear of the aircraft.

In various embodiments, the brake 106 may also be controlled by an antiskid/deceleration control unit 112 (ASK/DK) that is part of a brake control algorithm unit 115. The brake control algorithm unit 115 may include the ASK/DK 112, a brake control executive 114 (BKX), and a pressure control unit 116 (PK). The brake control algorithm 115 is illustrated as a component of BCU 102, but may also be implemented outside of BCU 102 and operate in concert with BCU 102. In various embodiments, the ASK/DK 112 may receive a fixed deceleration command value 118 from another unit of the BCU 102, a filtered wheel speed value 128 from the wheel assembly 107, and a filtered wheel acceleration value 129 from the wheel assembly 107. The fixed deceleration command value 118 may be a fixed acceleration value such as, for example, 5.8 m/s$^2$ or any acceleration value suitable to a braking application as determined based on aircraft weight, speeds, and braking capability.

The ASK/DK 112 can output a desired pressure command value 122 corresponding to a desired amount of pressure to be applied to the brake 106 based on the fixed deceleration command value 118, the filtered wheel speed value 128, and the filtered wheel acceleration value 129. The desired pressure command value may be based on an algorithm for reducing the likelihood of the aircraft skidding and/or based on an automatic deceleration algorithm. In various embodiments, the desired pressure command value comprises a negative desired pressure command for purposes as herein described (even though the braking pressure value cannot actually be less than zero).

The BKX 114 receives both the pilot desired pressure value 120 and the desired pressure command value 122 and issues a pressure command value 124 based on the pilot desired pressure value 120 and the desired pressure command value 122. In various embodiments, as hereinafter described, the pressure command value 124 may be equal to the negative desired pressure command value 122. The pressure command value 124 corresponds to a desired amount of pressure to be applied to the brake 106.

The BKX 114 also receives input from a touchdown flag that represents whether the aircraft has touched down and to ensure that no braking is permitted until the wheels have begun to spin to a desired speed. The BKX 114 also receives input from a locked wheel flag that represents when one of the wheel speeds has become too low. The BKX 114 may then reduce the pressure command value to zero to allow time for the wheel speed to spin back up.

The PK 116 may receive the pressure command value 124 and may convert the pressure command value 124 into a current command value 126. Current command value 126 may be a current measured in Amperes such as, for example, a current from the range of 2 mA-30 mA. The current command value 126 may be received by the brake control device 117 of the brake 106. Brake control device 117 may be designed to convert the current command value 126 into a pressure applied to an aircraft brake. The pressure may be applied to the one or more disks of a multi-disk brake system.

In various embodiments, the PK 116 may determine the current command value 126 based on a measured pressure value 132 corresponding to a measured pressure 132 applied to the one or more disks. In that regard, the determination of the current command value 126 may be based on a feedback system such that the current command value 126 is adjusted in an attempt to equalize the measured pressure value 132 and the pressure command value 124. In various embodiments, brake 106 may include a pressure sensor 109 for detecting the (measured) pressure applied 132 by the brake control device 117. The pressure sensor 109 may transmit the measured pressure value 132 to PK 116 for feedback control of brake control device 117. In embodiments using an electromechanical actuator for brake control device 117, pressure sensor may comprise a load cell output.

BCU 102 switches to open loop servo valve current control using a linear relationship between the current command value received by the brake control device 117 and the amount of pressure applied to the brake in response to BCU 102 detecting a failed pressure sensor. For example, in various embodiments, the relationship may be described as:

$$\text{current} = \frac{\text{pressure}}{151.2 \text{ psi/ma}} + 5.5 \text{ milliamps(mA)}.$$

Antiskid protection can continue to function properly because the antiskid algorithm still receives the wheel speed signal as feedback and can therefore continue to modulate pressure and current. Pressure sensor fault detections performed by the BCU include open circuit, short circuit, sensor excitation, and sensor out of range. Pressure sensor fault detections may be performed continuously during aircraft operation.

There are cases when the pressure sensor 109 can fail undetected by the BCU. For example, the pressure sensor may fail to an undetected and constant pressure value that is within the normal range of the pressure sensor 109, preventing the BCU 102 from detecting the failure (i.e., an out of range condition). For example, if the pressure sensor 109 fails at a constant value of 1000 psi (6895 kPa), even though the BCU cannot detect this failure (through an out of range condition), the BCU may indirectly detect that there is a failure because the BCU periodically monitors the system for uncommanded braking. When the pilot presses the pedals and requests, for example, 1500 psi, the PK requests maximum current to try to close the loop on pressure and bring the measured pressure value feedback of 1000 psi to a pressure of 1500 psi (10342 kPa). Under these conditions, the wheel will likely lock (an imminent skid condition). The BCU 102 detects this "lock-up" condition because of the feedback from the wheel speed sensor. More specifically, the BCU 102 may receive a low or 0 wheel speed signal from the wheel speed sensor. The AK/DK then requests a drop in pressure. In this example, as the pressure sensor 109 has failed at a constant 1000 psi (6895 kPa), the AK/DK, will continue to request less and less pressure because the measured pressure feedback is maintained at 1000 psi (6895 kPa) while the wheel continues to approach wheel locking. The AK/DK may output a desired pressure command value 122 that is less than 1000 psi (6895 kPa). At this point, the pressure error input to the PK has changed sign (it has now become negative) and the PK will output a zero current command to adjust the braking pressure to the lower desired pressure value commanded by the AK/DK. The system 100 will therefore still be able to release or apply pressure to prevent the wheel from locking.

When the pressure sensor 109 fails to a constant value below the uncommanded braking threshold for the aircraft but above the PK deadband value for that aircraft, the BCU cannot detect the pressure sensor failure, but antiskid protection still functions in a binary, on-off control fashion as described previously. Pressure can be applied and removed to the brake to prevent locking the wheel. The PK deadband value is aircraft specific, pre-set, and refers to the minimum pressure error input that the PK 116 needs to detect for reducing the current command 126 in order to maintain antiskid protection as herein described. For example, if the PK deadband is set to 50 psi (345 kPa), the PK needs to detect a minimum pressure error input of greater than 50 psi (345 kPa) for the current command output from the PK to be reduced to release brake pressure in order to maintain antiskid protection (i.e., to change the current command in an attempt to equalize the measured pressure value 132 and the pressure command value).

In accordance with various embodiments, the system 100 maintains the antiskid protection against wheel locking (imminent skid) even when the pressure sensor 109 fails undetected at a constant pressure value below the PK deadband by forcing the ASK/DK to output a negative desired pressure command value 122 (even though the measured or detected pressure value (i.e., the braking pressure actually be less than zero) if the ASK/DK, detects an imminent skid and if the negative desired pressure command from the ASK/DK 122 minus the measured feedback pressure 132 (i.e., the pressure error input) is greater than the deadband of the PK. The maximum negative value of the negative desired pressure command is pre-set, depending upon the aircraft. The BKX 114 receives both the pilot desired pressure value 120 and the negative desired pressure command value 122 and issues the pressure command value 124 based on the lesser of the pilot desired pressure value 120 and the negative desired pressure command value 122. The PK receives the negative desired pressure command value 122 and reduces the current command output in an attempt to equalize the measured pressure value 132 and the negative pressure command value of the pressure command 124. As a result, antiskid protection is maintained by releasing the braking pressure.

By contrast, in a conventional brake control system, antiskid protection could not be maintained when the pressure sensor 109 fails undetected at a constant pressure value below the PK deadband. However, in accordance with various embodiments, the ASK/DK may output the negative pressure command value to the brake, even though the braking pressure cannot actually decrease below zero. In the above-described example where the pressure sensor failed at an undetected and constant value of 0 psi, and the output of the PK is set to request maximum current due to pilot pedal application, because of the ability of the ASK/DK to request a negative pressure command value, the PK detects a negative input error and will reset and command the servo valve current to decrease in an attempt to equalize with the negative pressure command value. Thus, the braking pressure will be released and antiskid protection will still be achieved in the one-off mode described above. Anti-skid protection against wheel locking may also be maintained when the pressure sensor has failed to an undetected and constant pressure value that is between 0 psi and the PK deadband as the pressure input error to the pressure controller will be more than the PK deadband. For example, in the example provided above, if the ASK/DK outputs a negative desired pressure command value 122 of, for example, −150 psi (−1034 kPa), the pressure input error to the PK is equal to −100 psi (−150 psi+50 psi (the PK deadband)). As the absolute value of the pressure input error is 100 psi (689 kPa) and thus greater than the PK deadband of 50 psi (345 kPa), the ASK/DK will output the negative desired pressure command to the PK and cause the current command output from the PK to be reduced to release braking pressure. At that point, open loop pressure control becomes active and nominal antiskid protection takes over.

In various embodiments, by reducing the desired pressure command 122 from the ASK/DK to a negative desired pressure command, the current command to the brake control device 117 may be forced to zero. The pressure to the brake 106 is thereby relieved so that the wheel mechanically coupled to the brake 106 may spin up to rolling speed. The BCU may then report a failure condition, indicating that system 100 is performing safely but with degraded performance. In response to a failure condition, the system 100 operation switches to open-loop pressure control and ignores the measured pressure value 132 that is otherwise used as feedback. At that point, the nominal antiskid protection may resume.

Figure 2:
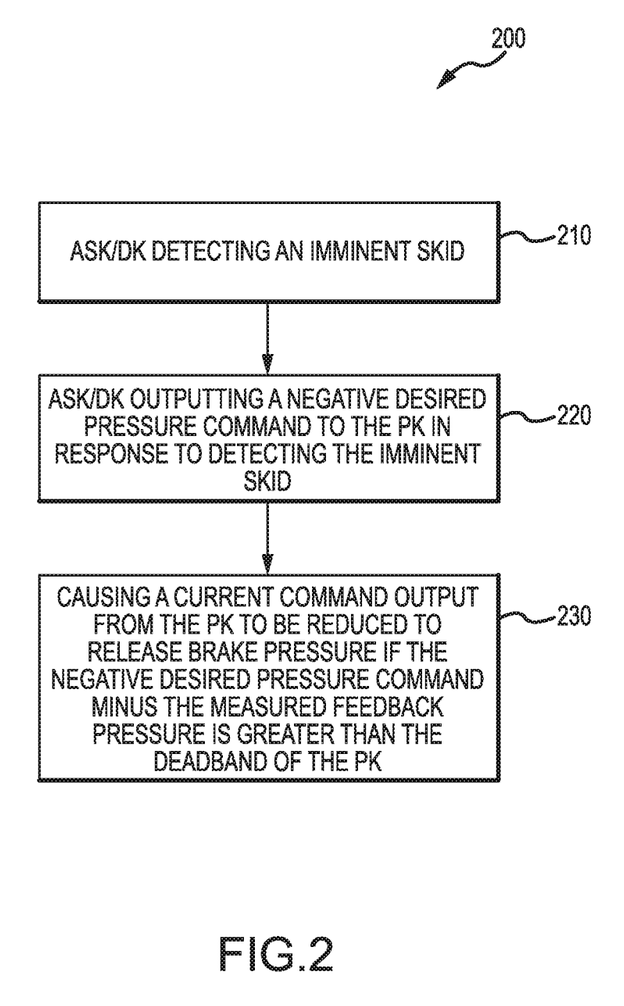
FIG. 2 illustrates a flowchart of a method for providing antiskid protection with an undetected pressure sensor failure using a brake system, in accordance with various embodiments.

With reference to FIG. 2, a flow diagram of a method 200 for providing antiskid protection with undetected pressure sensor failure using system 100 is provided. The method 200 for providing antiskid protection with undetected pressure sensor failure begins by the ASK/DK detecting an imminent skid (i.e., that the wheel is about to lock up) (step 210). The method 200 for providing antiskid protection with undetected pressure sensor failure continues by the ASK/DK outputting a negative desired pressure command to the PK in response to detecting the imminent skid (step 220) and causing a current command output from the PK to be reduced to release brake pressure if the negative desired pressure command minus the measured feedback pressure is greater than the deadband of the PK (step 230). From the foregoing, it is to be appreciated that by forcing a negative pressure command, even if the pressure sensor fails undetected at a constant value of 0 psi or any psi (or pressure unit) that is less than the PK deadband, the negative pressure command will result in a reduced current command to release the pressure on the brake (braking pressure) to prevent wheel locking (i.e., skidding). As a result, antiskid protection may be extended even when the pressure sensor fails to an undetected and constant value that is less than the PK deadband.

Figure 3:
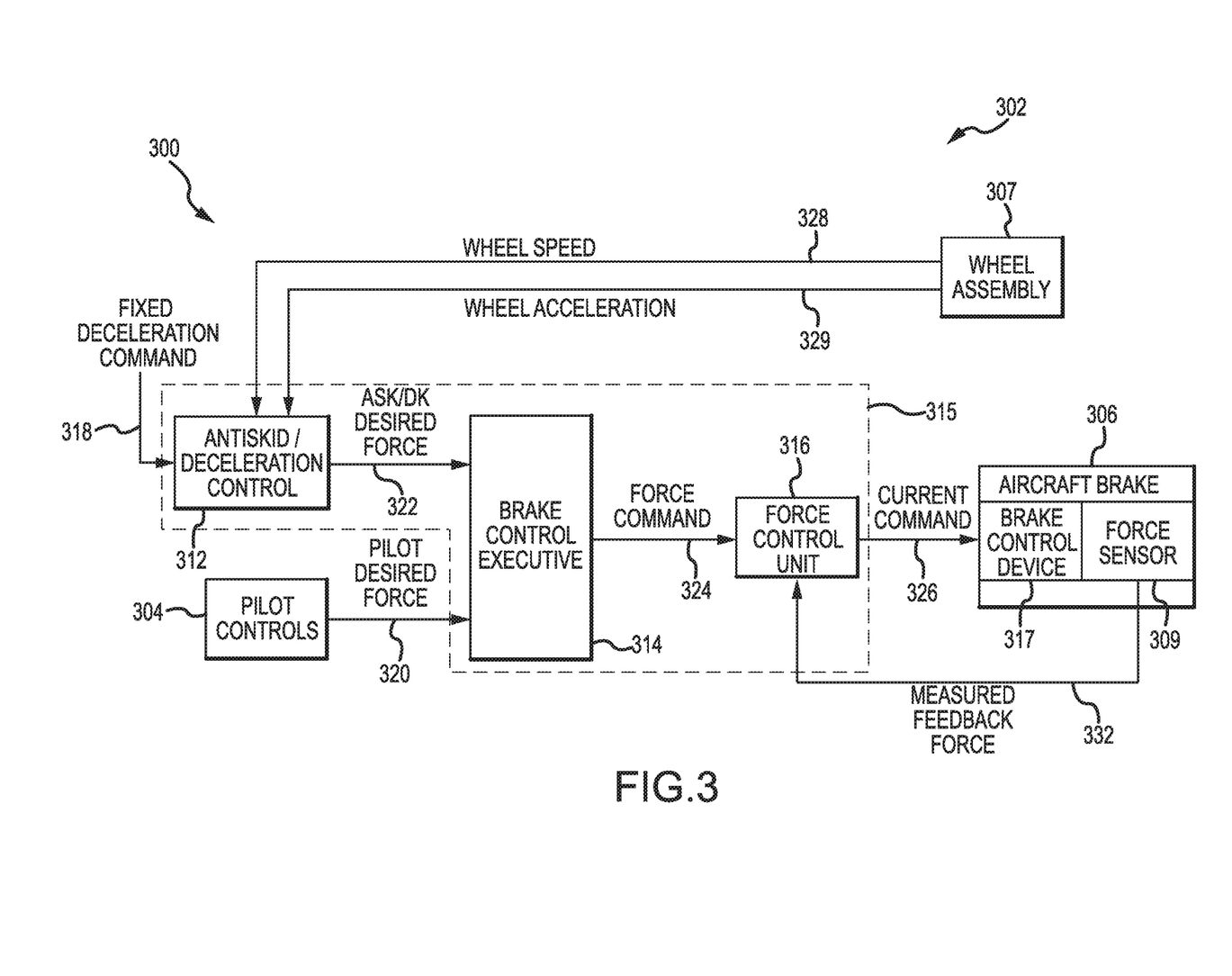
FIG. 3 illustrates an electric brake system on an aircraft for providing antiskid protection with an undetected force sensor failure, in accordance with various embodiments.
Figure 4:
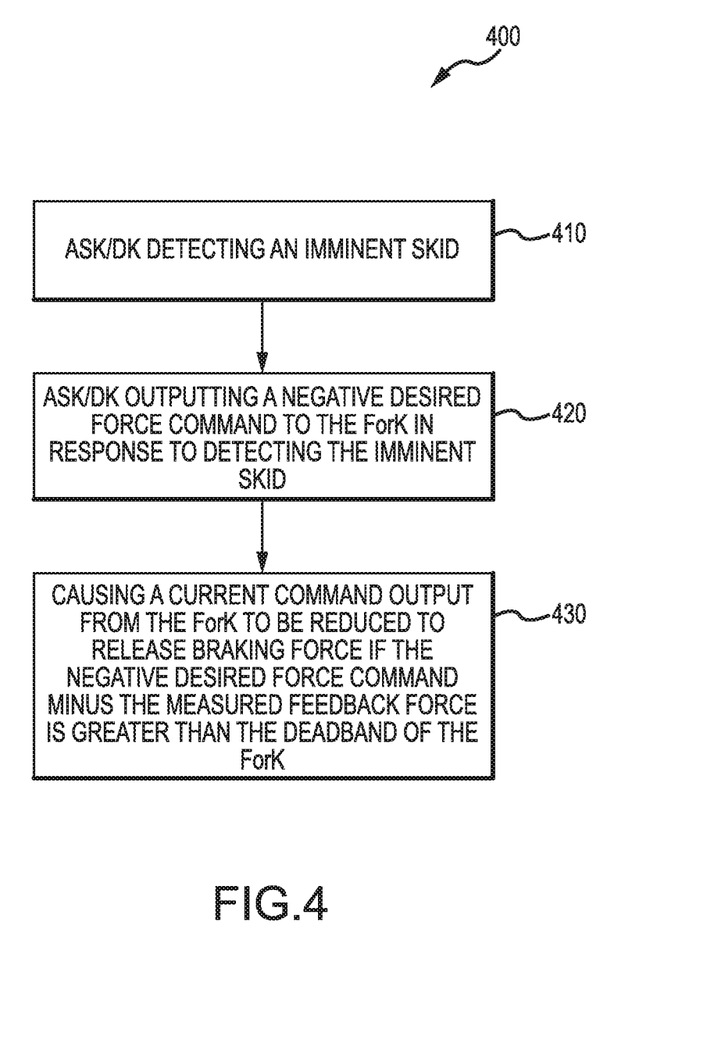
FIG. 4 illustrates a flowchart of a method for providing antiskid protection with an undetected force sensor failure using an electric brake system, in accordance with various embodiments.

While a hydraulic brake control system has been described for maintaining anti-skid protection with undetected pressure sensor failure, it is to be understood that, in accordance with various embodiments as depicted in FIGS. 3 and 4, various embodiments may be used in an electric brake control system 300 for maintaining anti-skid protection with undetected force sensor failure. Like system 100, system 300 includes a brake control unit (BCU) 302, a set of pilot controls 304, the brake 306, and a wheel assembly 307. In various embodiments, the brake 306 may apply stopping force in response to force applied by a brake control device 317. The electric brake control system 300 may maintain antiskid protection against wheel locking (imminent skid) even when a force sensor 309 fails undetected at a constant force value that is at least one of or below a deadband of a force control unit 316 (a "ForK deadband") by forcing an antiskid/deceleration control unit (ASK/DK) 312 to output a negative desired force command value 322 (even though the measured or detected force value (i.e., the braking force) cannot actually be less than zero) if the ASK/DK detects an imminent skid and if the negative desired force command 322 from the ASK/DK 312 minus a measured feedback force 332 (i.e., the force error input) is greater than the deadband of the ForK 316. Referring now specifically to FIG. 4, according to various embodiments, a method 400 for controlling brakes using system 300 begins by the ASK/DK 312 detecting the imminent skid (step 410) and outputting the negative desired force command 322 to the force control unit (ForK) 316 in response to detecting the imminent skid (step 420) and causing a current command output 326 from the ForK 316 to be reduced to release braking force if the negative desired force command 322 minus the measured feedback force 332 is greater than the ForK deadband (step 430).

Like the hydraulic brake control system, the electric brake control system 400 comprises a processor and a tangible, non-transitory memory configured to communicate with the processor. The tangible, non-transitory memory has instructions stored thereon that, in response to execution by the processor, cause the anti-skid/deceleration (ASK/DK) control unit 312 to perform operations comprising detecting an imminent skid and outputting the negative desired force command 322 to the force control unit (ForK) 316 in response to detecting the imminent skid and causing the current command output 326 from the ForK 316 to be reduced to release braking force if the negative desired force command 322 minus the measured feedback force 332 is greater than the ForK deadband. A maximum negative value of the negative desired force command value 322 and the ForK deadband are pre-set. Like in the hydraulic brake control system, detecting an imminent skid is based on at least one of a fixed deceleration command value 318, a filtered wheel speed value 328, and a filtered wheel acceleration value 329. Causing the current command output 326 from the ForK 316 to release braking force occurs with an undetected force sensor failure at a constant force value that is at least one of at or below the deadband of the ForK. Causing the command output from the ForK to be reduced occurs because the ForK adjusts the command in an attempt to equalize the measured feedback force 332 with the negative desired force command 322. The negative desired force command 322 minus the measured feedback force 332 comprises a force error input, and causing the command output from the ForK to be reduced occurs because the ForK adjusts the command in an attempt to achieve a zero force error input.

The BKX 314 in electric brake control system 300 receives both the pilot desired force value 320 and the desired force command value 322 and issues a force command value 324 based on the pilot desired force value 320 and the desired force command value 322. In various embodiments, as hereinafter described, the force command value 324 may be equal to the negative desired force command value 322. The force command value 324 corresponds to a desired amount of force to be applied to the brake 306. FIG. 3 also depicts a brake control algorithm unit 315 such as previously described for system 100.

In various embodiments, by reducing the desired force command from the ASK/DK to a negative desired force command, the current command to the brake control device may be forced to zero. The force to the brake is thereby relieved so that the wheel mechanically coupled to the brake may spin up to rolling speed. The BCU may then report a failure condition, indicating that system is performing safely but with degraded performance. In response to a failure condition, the system operation switches to open-loop force control and ignores the measured feedback force value that is otherwise used as feedback. At that point, the nominal antiskid protection may resume.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than e appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling brakes, comprising:
   detecting, by an anti-skid controller/deceleration controller (ASK/DK), an imminent skid; and
   outputting, by the ASK/DK, at least one of:
      a negative desired pressure command to a pressure control unit (PK) in response to detecting the imminent skid and causing a current command output from the PK to be reduced to release braking pressure if the negative desired pressure command minus a measured feedback pressure is greater than a deadband of the PK; or
      a negative desired force command to a force control unit (ForK) in response to detecting the imminent skid and causing a current command output from the ForK to be reduced to release braking force if the negative desired force command minus a measured feedback force is greater than a deadband of the ForK.

2. The method of claim 1, wherein a maximum negative value of the negative desired pressure command value, the deadband of the PK, and the deadband of the ForK are pre-set.

3. The method of claim 1, wherein detecting the imminent skid is based on at least one of a fixed deceleration command value, a filtered wheel speed value, and a filtered wheel acceleration value.

4. The method of claim 1, wherein causing the current command output from the PK to be reduced to release the braking pressure occurs with an undetected pressure sensor failure at a constant pressure value that is at least one of at or below the deadband of the PK.

5. The method of claim 1, wherein causing the current command output from the PK to be reduced occurs because the PK is configured to adjust the current command in an attempt to equalize the measured feedback pressure with the negative desired pressure command.

6. The method of claim 5, wherein the negative desired pressure command minus the measured feedback pressure comprises a pressure error input, and causing the current command output from the PK to be reduced occurs because the PK is configured to adjust the current command in an attempt to achieve a zero pressure error input.

7. A brake control system, comprising:
   an anti-skid/deceleration control unit (ASK/DK) configured to detect an imminent skid and to output a negative desired pressure command in response to detecting the imminent skid; and
   a pressure control unit (PK) configured to output a reduced current command to release a braking pressure if the negative desired pressure command minus a measured feedback pressure is greater than a deadband of the PK.

8. The brake control system of claim 7, further comprising a brake control executive (BKX) configured to set a pressure command to a minimum value selected from a pilot desired pressure and the negative desired pressure.

9. The brake control system of claim 7, wherein the ASK/DK is configured to output the negative pressure command value with undetected pressure sensor failure at a constant pressure value that is at least one of at or below the deadband of the PK.

10. The brake control system of claim 7, wherein a maximum negative value of the negative desired pressure command value and the deadband of the PK are pre-set.

11. The brake control system of claim 7, wherein the current command output from the PK is reduced because the PK is configured to adjust the current command in an attempt to equalize the measured feedback pressure with the negative desired pressure command.

12. The brake control system of claim 11, wherein the negative desired pressure command minus the measured feedback pressure comprises a pressure error input and the PK is configured to adjust the current command value in an attempt to have the pressure error input equal to zero.

13. The brake control system of claim 11, wherein the imminent skid is detected by the ASK/DK based on at least one of a fixed deceleration command value, a filtered wheel speed value, and a filtered wheel acceleration value.

14. A brake control system comprising:
    a processor;

a tangible, non-transitory memory configured to communicate with the processor, the tangible, non-transitory memory having instructions stored thereon that, in response to execution by the processor, cause an anti-skid/deceleration (ASK/DK) control unit to perform operations comprising:

detecting an imminent skid; and one of:

outputting a negative desired pressure command to a pressure control unit (PK) in response to detecting the imminent skid and causing a current command output from the PK to be reduced to release braking pressure if the negative desired pressure command minus a measured feedback pressure is greater than a deadband of the PK, or outputting a negative desired force command to a force control unit (ForK) in response to detecting the imminent skid and causing a current command output from the ForK to be reduced to release braking force if the negative desired force command minus a measured feedback force is greater than a deadband of the ForK.

15. The brake control system of claim 14, further comprising a brake control executive (BKX) configured to set a pressure command to a minimum value selected from a pilot desired pressure and the negative desired pressure.

16. The brake control system of claim 14, wherein the ASK/DK is configured to at least one of output the negative pressure command value with undetected pressure sensor failure at a constant pressure value that is at least one of at or below the deadband of the PK.

17. The brake control system of claim 14, wherein a maximum negative value of the negative desired pressure command value, the deadband of the PK, and the deadband of the ForK are pre-set.

18. The brake control system of claim 14, wherein the current command output from the PK is reduced because the PK is configured to adjust the current command in an attempt to equalize the measured feedback pressure with the negative desired pressure command value.

19. The brake control system of claim 18, wherein the negative desired pressure command minus the measured feedback pressure comprises a pressure error input and the PK is configured to adjust the current command in an attempt to have a zero pressure error input.

20. The brake control system of claim 14, wherein the imminent skid is detected by the ASK/DK based on at least one of a fixed deceleration command value, a filtered wheel speed value, and a filtered wheel acceleration value.

* * * * *